(12) United States Patent
Kim et al.

(10) Patent No.: US 12,005,993 B2
(45) Date of Patent: Jun. 11, 2024

(54) MOVABLE MAGNET BICYCLE PEDAL, AND SHOE COUPLING DEVICE EQUIPPED WITH MEANS FOR PREVENTING ATTACHMENT OF METAL POWDER

(71) Applicants: Do Young Kim, Seoul (KR); Kyeong Sook Yoon, Seoul (KR); Ji Heon Kim, Seoul (KR); Ji Seong Kim, Seoul (KR)

(72) Inventors: Do Young Kim, Seoul (KR); Kyeong Sook Yoon, Seoul (KR); Ji Heon Kim, Seoul (KR); Ji Seong Kim, Seoul (KR)

(*) Notice: Subject to any disclaimer, the term of this patent is extended or adjusted under 35 U.S.C. 154(b) by 398 days.

(21) Appl. No.: 17/298,586

(22) PCT Filed: Nov. 27, 2019

(86) PCT No.: PCT/KR2019/016461
§ 371 (c)(1),
(2) Date: May 30, 2021

(87) PCT Pub. No.: WO2020/111770
PCT Pub. Date: Jun. 4, 2020

(65) Prior Publication Data
US 2022/0055714 A1    Feb. 24, 2022

(30) Foreign Application Priority Data

Nov. 30, 2018 (KR) .................. 10-2018-0152101
Nov. 26, 2019 (KR) .................. 10-2019-0153689

(51) Int. Cl.
B62M 3/08         (2006.01)
A43B 5/14         (2006.01)
(Continued)

(52) U.S. Cl.
CPC .............. *B62M 3/086* (2013.01); *A43B 5/14* (2013.01); *A43B 13/36* (2013.01); *F16B 1/00* (2013.01); *F16B 2200/83* (2023.08)

(58) Field of Classification Search
None
See application file for complete search history.

(56) References Cited

U.S. PATENT DOCUMENTS 5,473,963 A * 12/1995 Aeschbach .............. A43B 5/14
                                                36/131
5,704,256 A *  1/1998 De Lattre ............ A43B 1/0054
                                                36/131
(Continued)

FOREIGN PATENT DOCUMENTS

CN         100509540 C      7/2009
CN         208134541 U     11/2018
(Continued)

*Primary Examiner* — Vicky A Johnson
(74) *Attorney, Agent, or Firm* — Maschoff Brennan

(57) ABSTRACT

The present invention relates to a movable magnet type bicycle pedal, and a shoe coupling device equipped with a means for preventing attachment of metal powder. More particularly, the present invention relates to a movable magnet type bicycle pedal and a shoe coupling device equipped with a means for preventing attachment of metal powder, wherein the shoe coupling device and the pedal are respectively provided with a magnet, and are coupled to each other by magnetic force only during pedaling, and, when the pedaling is stopped or the running of a bicycle is stopped, the coupling between the magnets is released through a magnetic separation means and at the same time metal powder attached to a shoe is caused to fall so as to prevent the metal powder from being attached to the shoe.

19 Claims, 10 Drawing Sheets

(51) Int. Cl.
  *A43B 13/36* (2006.01)
  *F16B 1/00* (2006.01)

(56) References Cited

U.S. PATENT DOCUMENTS

2016/0304156 A1\* 10/2016 Pepito .................... B62M 3/086
2019/0168842 A1\* 6/2019 Ball ......................... H01F 7/04

FOREIGN PATENT DOCUMENTS

| JP | 3151000 U | 6/2009 |
| KR | 10-2011-0135795 A | 12/2011 |
| KR | 10-1149244 | 5/2012 |
| KR | 10-1746952 B1 | 6/2017 |

\* cited by examiner

[FIG. 1]
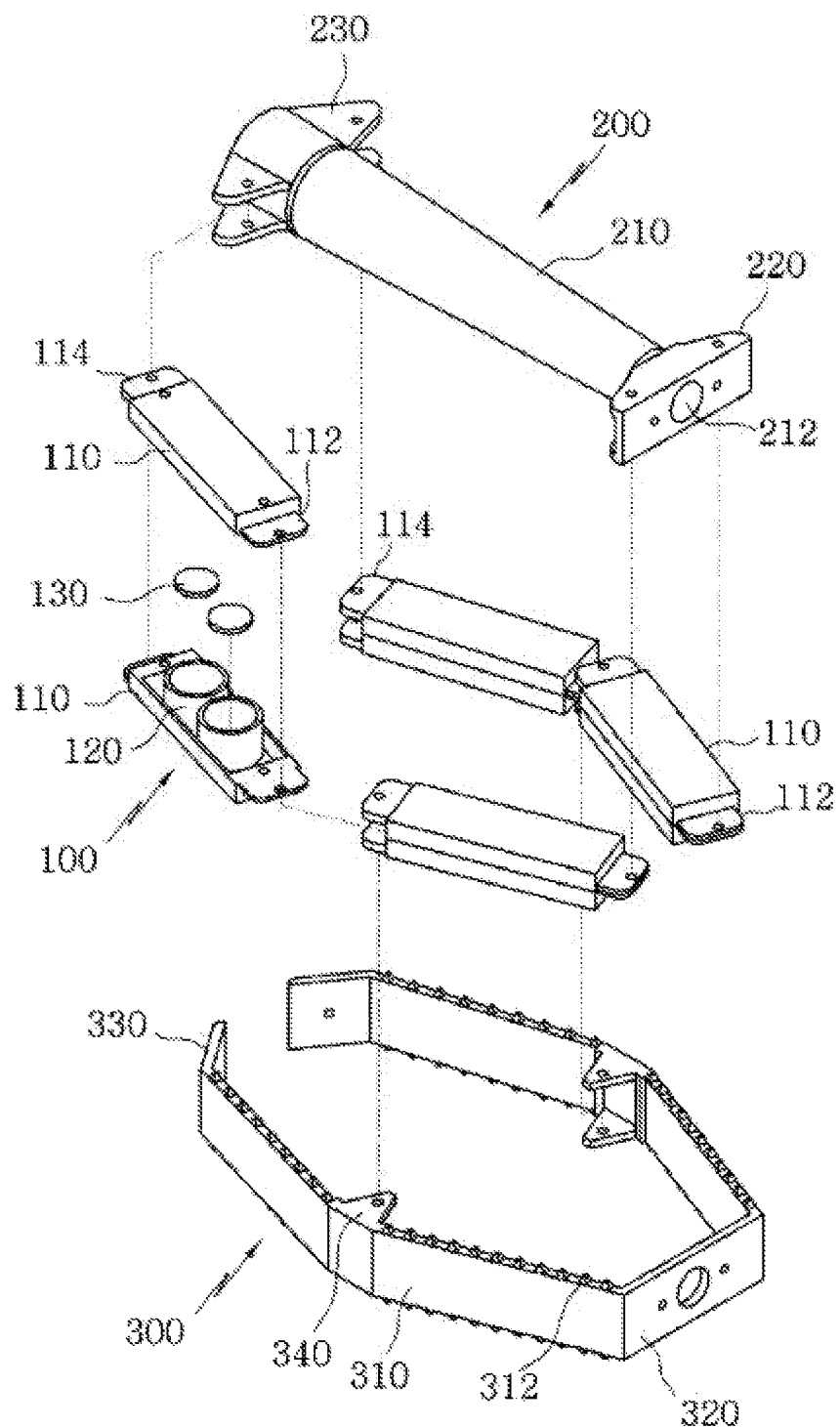

[FIG. 2]
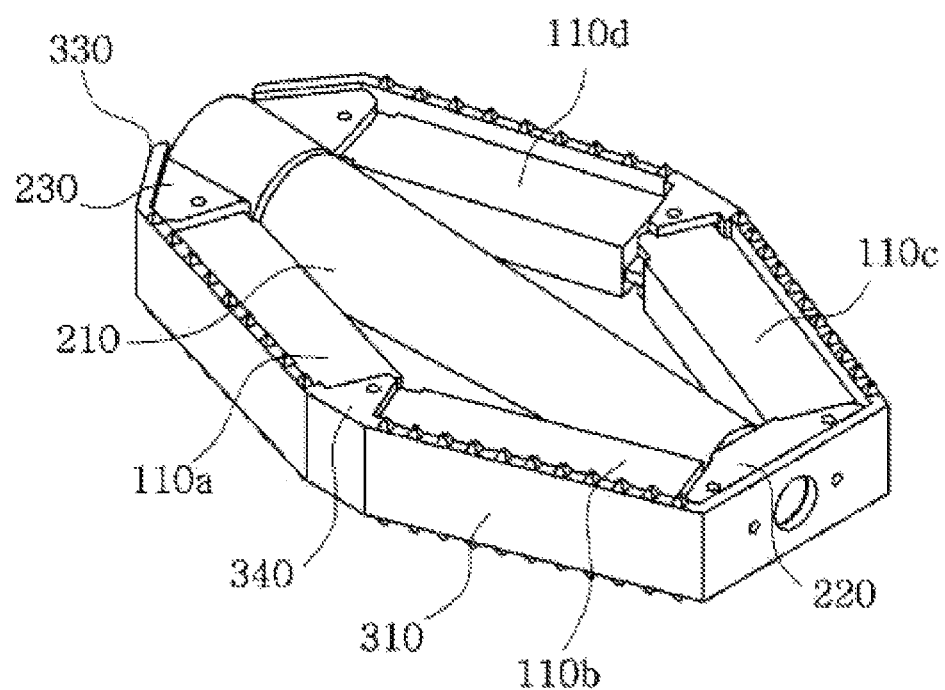

[FIG. 3]
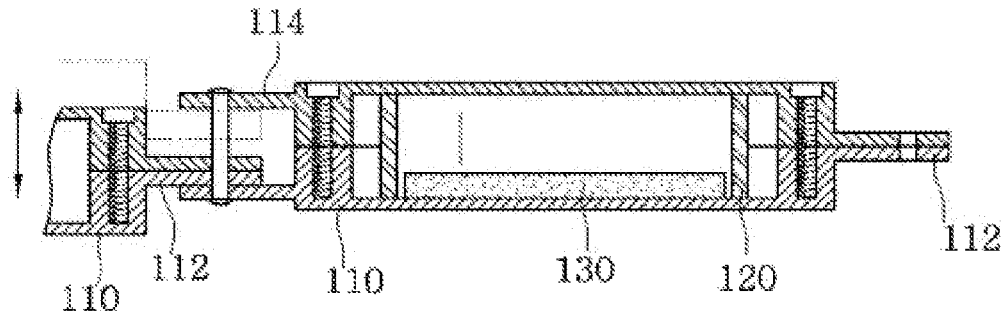
[FIG. 4]
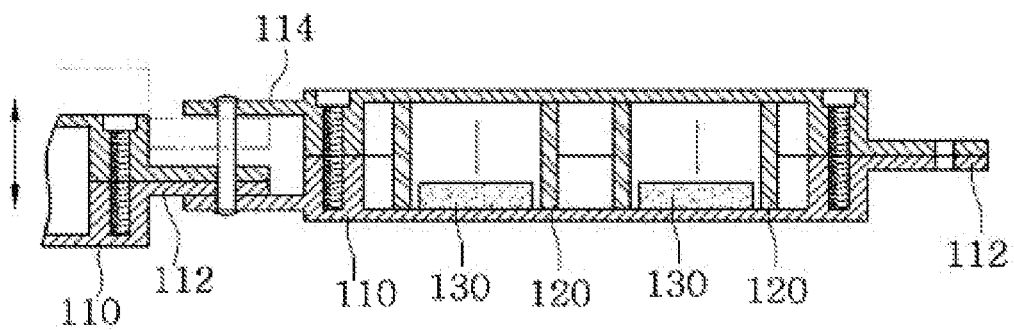
[FIG. 5]
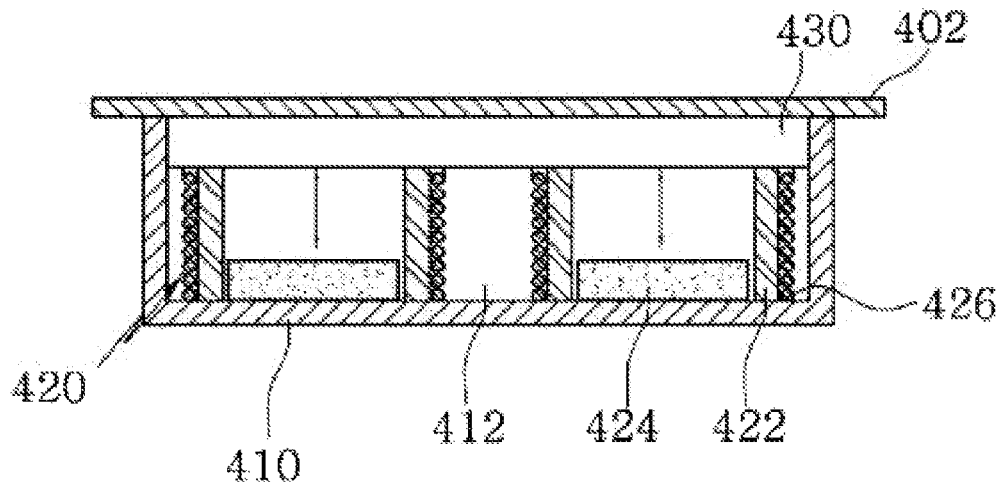

[FIG. 6]
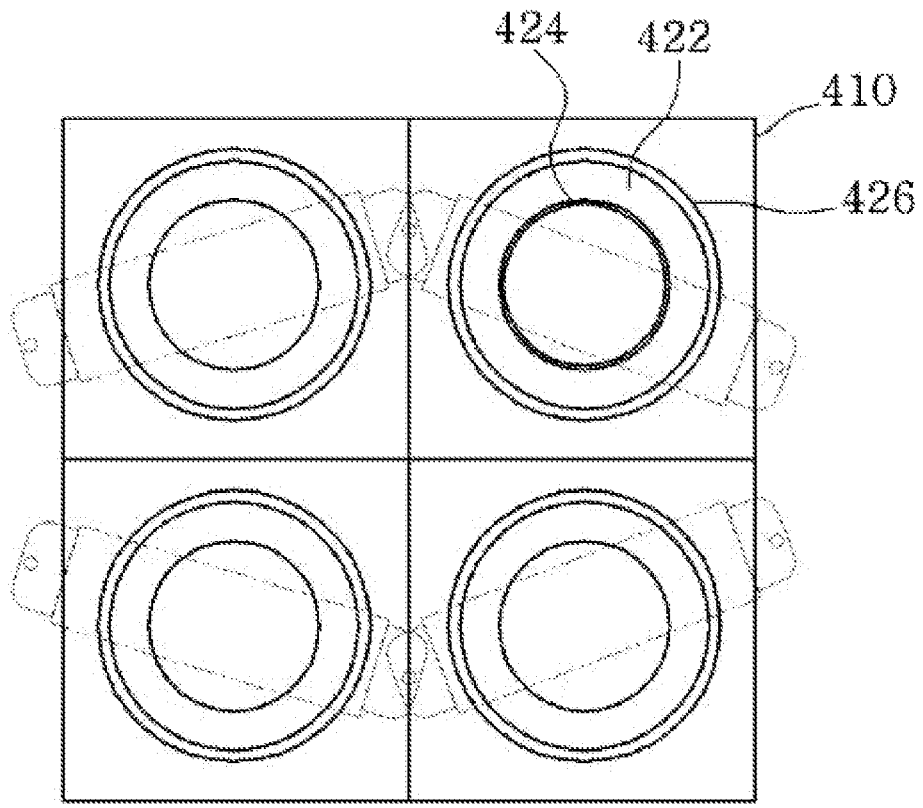
[FIG. 7]
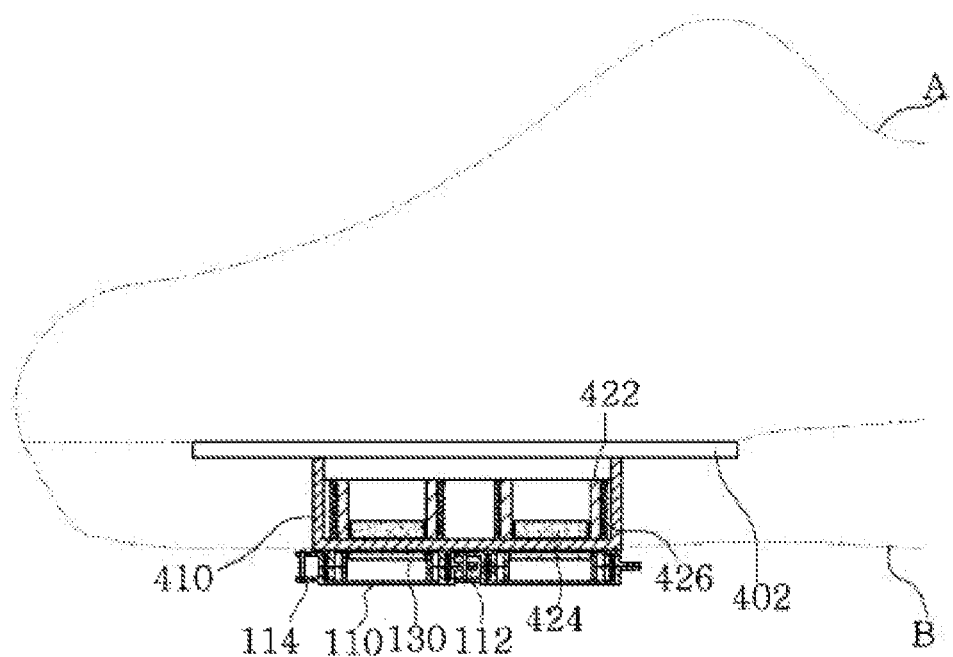

[FIG. 8]
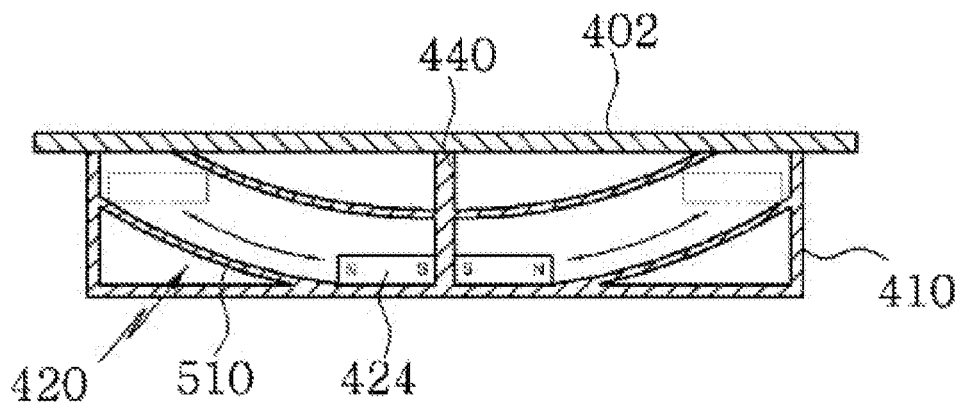
[FIG. 9]
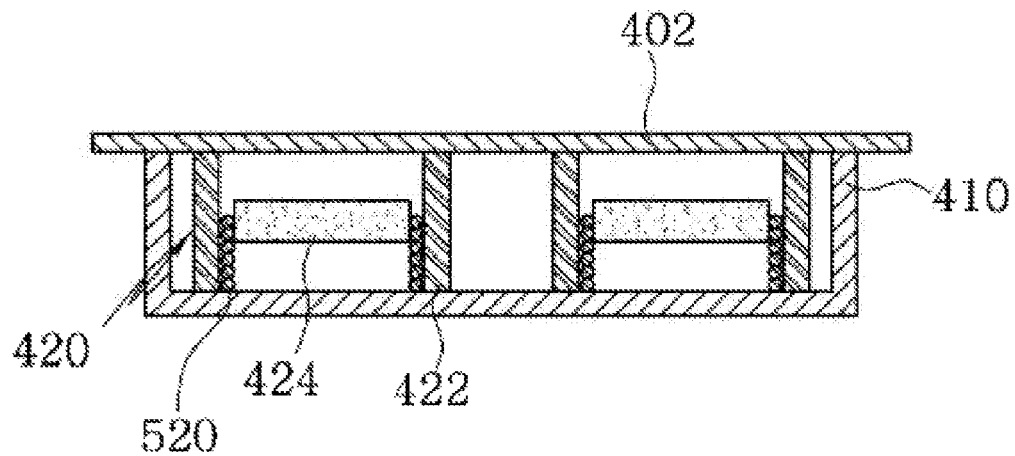

[FIG. 10]
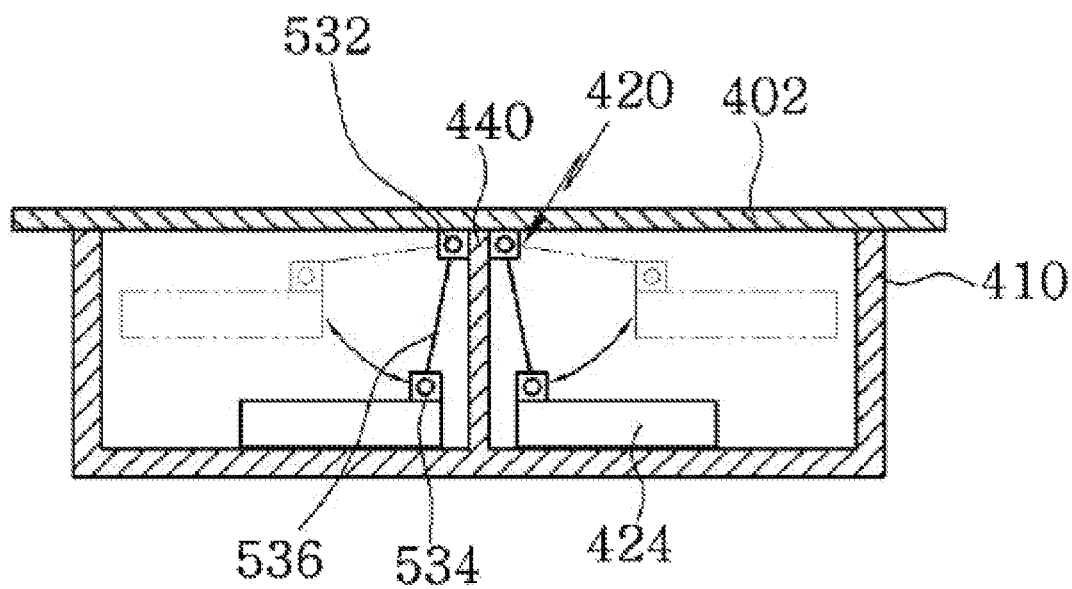
[FIG. 11]
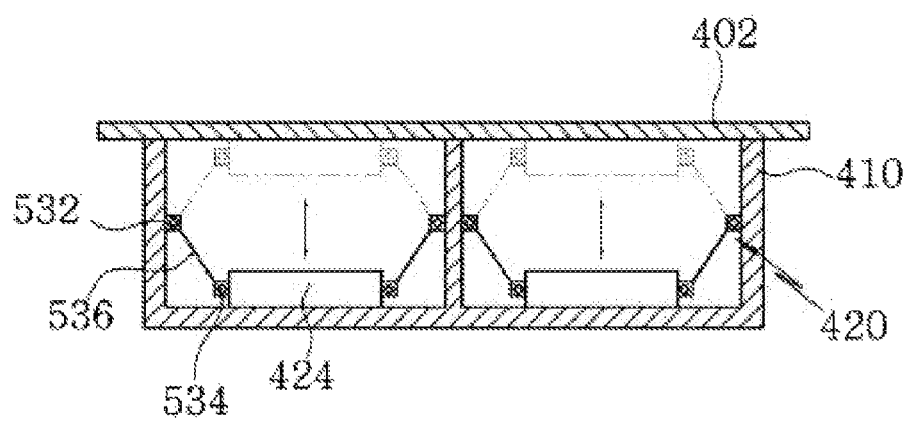

[FIG. 12]
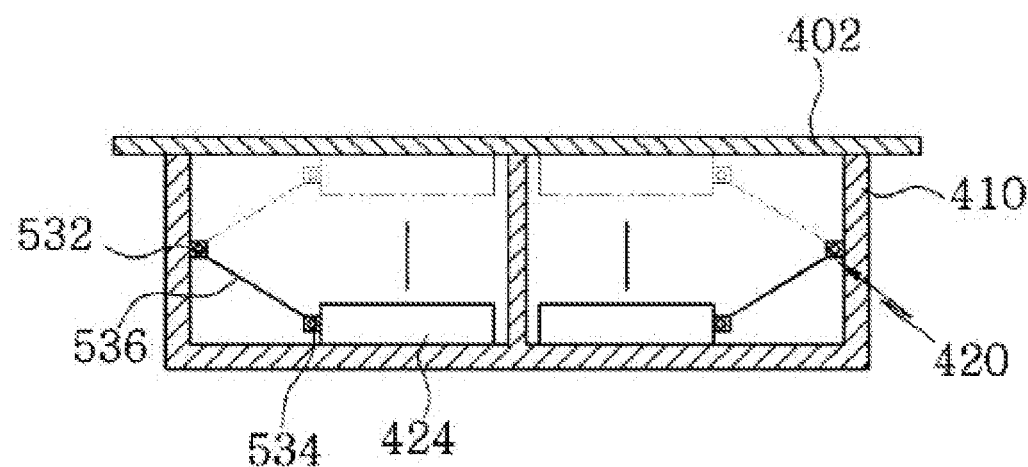
[FIG. 13]
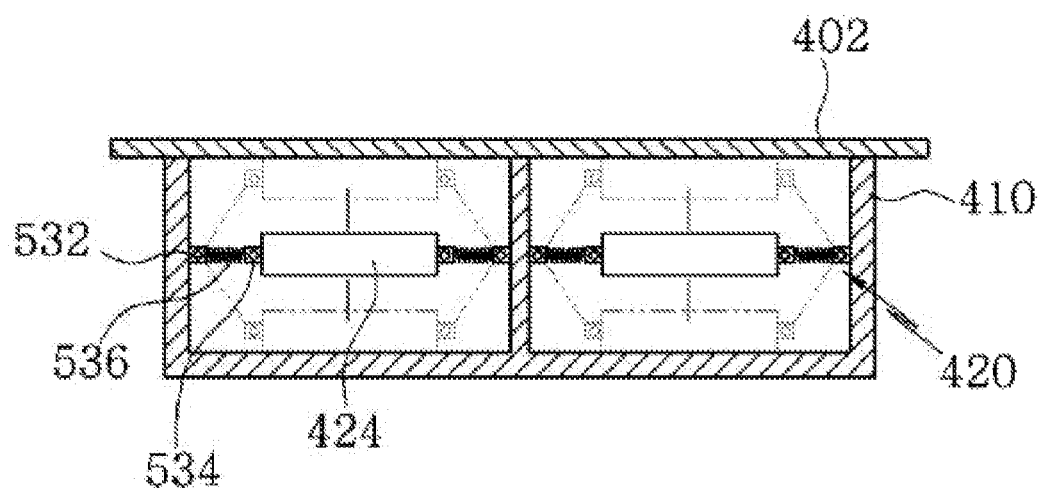

[FIG. 14]
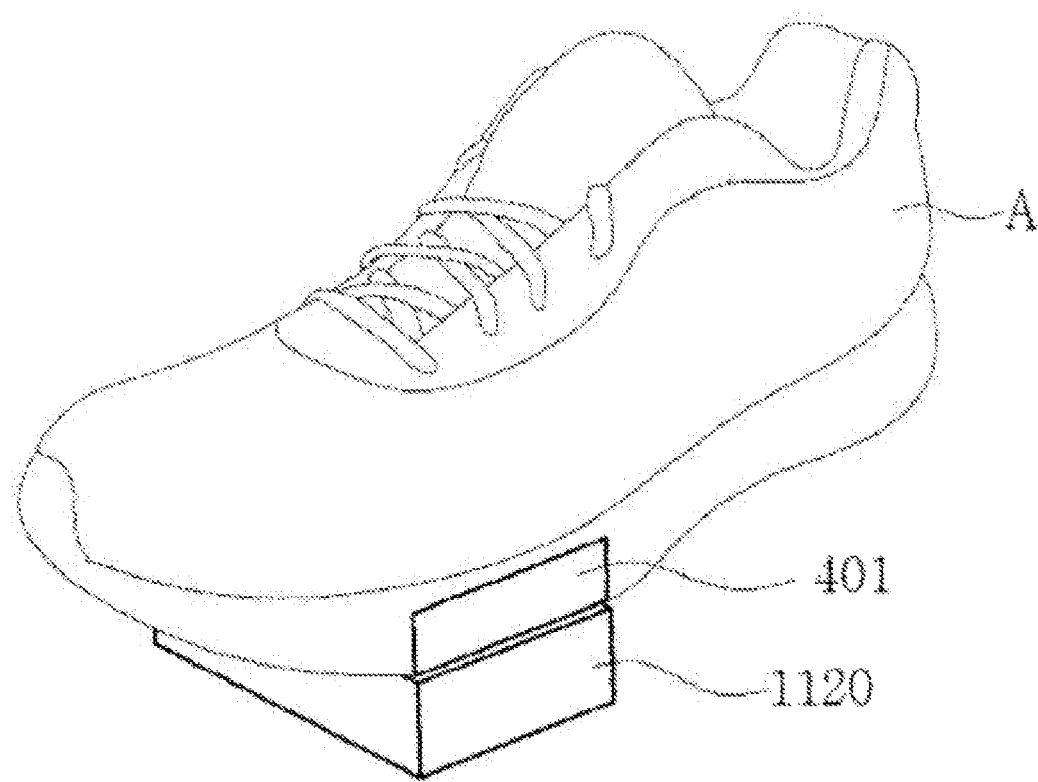

[FIG. 15]
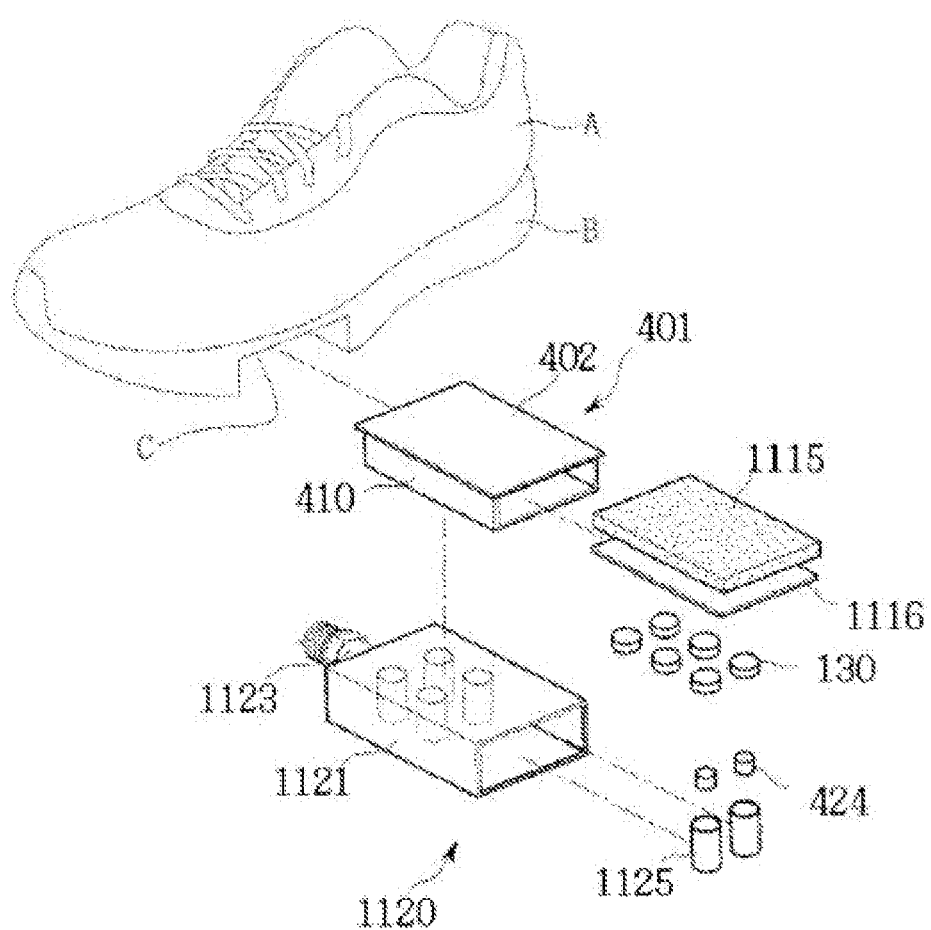

[FIG. 16]
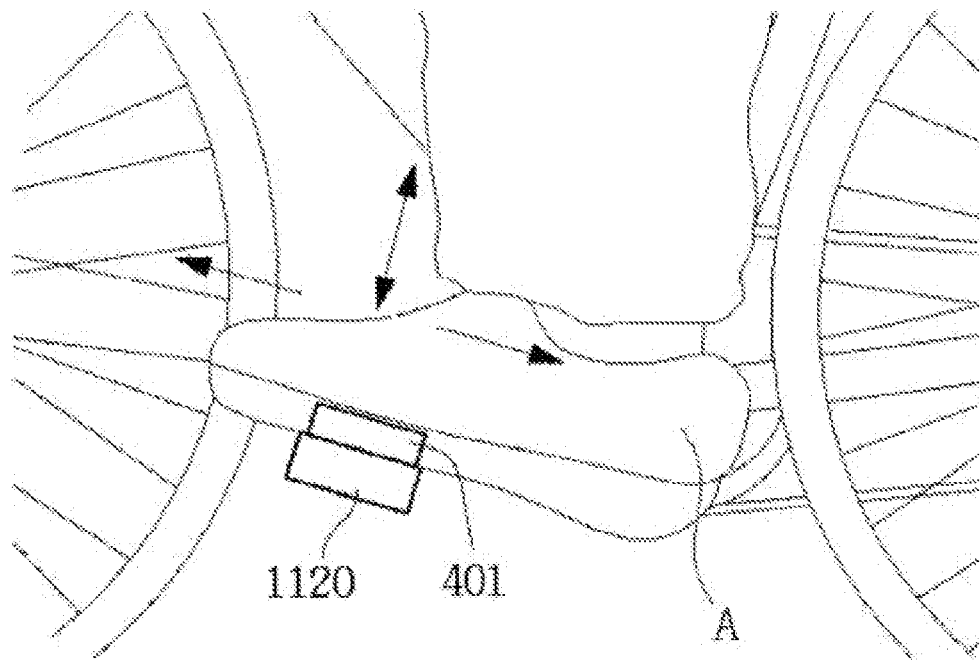
[FIG. 17]
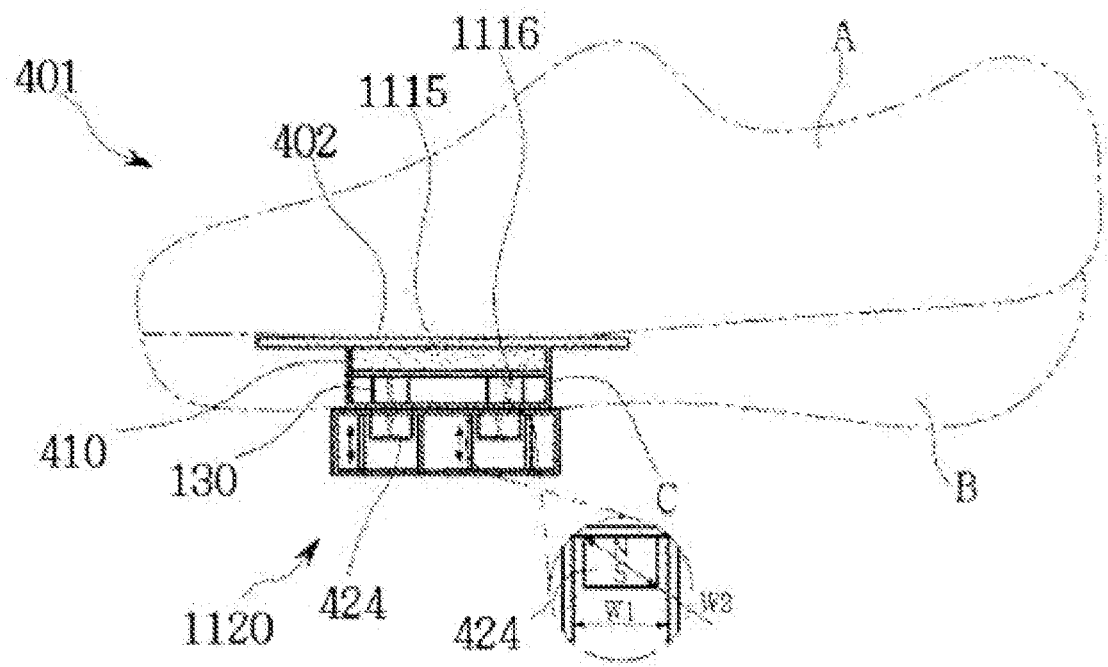

MOVABLE MAGNET BICYCLE PEDAL, AND SHOE COUPLING DEVICE EQUIPPED WITH MEANS FOR PREVENTING ATTACHMENT OF METAL POWDER

FIELD OF INVENTION

The present invention relates to a shoe coupling device provided with a movable magnetic bicycle pedal and a means for preventing metal debris attachment, and more specifically, a shoe coupling device provided with a mobile magnet type bicycle pedal and a metal powder attachment preventing means, wherein each of the shoe coupling device and the pedal is provided with a magnet, coupling is performed by magnetic force when pedaling only, whereas coupling between the magnets is released by a magnet separation means when pedaling is stopped or driving is completed and, at the same time, metal debris or powder stuck to the shoe may drop, thereby preventing the metal debris or powder from being adhered to the shoe.

BACKGROUND OF INVENTION

In general, when pedaling a bicycle, slippage often occurs between a shoe and a pedal, thus causing rotational force by the rider's foot movement to not be sufficiently transmitted to the pedal. For this reason, a variety of solutions to overcome the above problem have been developed.

As an example, Korean Patent Registration No. 10-1149244 disclosed a bicycle pedal provided with a magnetic body, which is coupled to a crank arm of the bicycle, and includes: a shaft coupled to the crank arm at one side thereof; a casing that is rotatably coupled with the other side of the shaft; a shaft coupling member coupled to the shaft and disposed inside the casing, which has a magnetic body disposed at one side thereof; and a seating part disposed on an upper portion of the casing so that the shoes are detachably seated thereon, through which magnetic flux is transmitted by magnetic force of the magnetic body, wherein, when the seating part circumferentially moves to generate driving force, a distance between the seating part and the magnetic body coupled to the shaft coupling member is altered in response to a varying angle of the shaft and the seating part during circumferential movement of the seating part, and the magnetic flux is transmitted through the seating part according to the altered distance between the magnetic body and the seating part However, according to the above-mentioned prior art, metal powder or the like generated when the pedal is driven is adhered to the sole of the shoe, hence causing a problem in that the sole of the shoe slips due to friction between the pedal and the metal powder when the pedal is driven.

Therefore, in the case of a professional bicycle, there is adopted a structure in which a bicycle shoe equipped with a cleat may be coupled to a pedal to increase binding force between the shoe and the pedal.

For example, Korean Patent Registration No. 10-1746952 disclosed a coupling device for a bicycle pedal and a bicycle shoe, wherein a magnet is installed inside the bicycle pedal and a metal member is formed on the bottom of the bicycle shoe, whereby the shoe can be coupled to a racing bicycle pedal by magnetic force.

However, according to the above-mentioned prior art, a position of the magnet may be arbitrarily changed during pedaling so that magnetic force between the metal member and the magnet may not be kept constant, and metal debris or powder generated during pedaling may be adhered to the metal member or around the magnet to induce slipping, hence causing a problem in that it is difficult to transmit correct force for pedaling.

SUMMARY OF INVENTION

Technical Problem to be Solved

The present disclosure has been devised from the above-described background of art to overcome the aforementioned problems, and an object of the present invention is to provide a shoe coupling device provided with a mobile magnet type bicycle pedal and a metal powder attachment-preventing means, which includes: a magnet provided in each of the shoe coupling device and the pedal so that coupling is implemented by magnetic force when pedaling only, whereas coupling between the magnets is released by a magnet separation means when pedaling is stopped or riding is completed and, at the same time, metal debris or powder ("metal powder") stuck to the shoe may drop while preventing the metal powder from being adhered to the shoe.

Further, another object of the present invention is to provide a shoe coupling device provided with a mobile magnet type bicycle pedal and a metal powder attachment-preventing means, which includes: a magnet guide member with a built-in magnet that is configured to implement reciprocating movement up and down, wherein the magnet guide member moves downward by force applied during pedaling in order to improve contact between the shoe and an uneven member of the pedal, thereby preventing the shoe from slipping.

Further, a still further object of the present invention is to provide a shoe coupling device provided with a mobile magnet type bicycle pedal and a metal powder attachment-preventing means, which includes: a magnet provided in the shoe coupling device, as well as a magnet provided in the pedal, wherein the magnet in the shoe coupling device moves upward from the bottom using repulsive force or attraction between these magnets, whereby magnetic force between metal powder stuck to the bottom surface of a shoe and the magnet is weakened (or reduced) to naturally separate the metal powder, thereby preventing the sole of the shoe from slipping due to the metal powder.

Technical Solution

According to an embodiment of the present invention to achieve the above objects, there is provided a shoe coupling device coupled to the sole of a shoe, which includes: a magnetic separation means configured to reduce magnetic force and separate metal debris or powder ("metal powder"); a plurality of magnet guide members in which a first magnetic body is built in such a way that coupling or decoupling is implemented by repulsive force or attraction between the magnetic separation means and the magnetic body, and which is connected to one another to move upward and downward; an operation support housing to which both ends of the plurality of magnet guide members are coupled to enable movement up and down ("vertical movement"), and to which a pedal shaft is further coupled; and a pedal frame to which the operation support housing is coupled, wherein each magnet guide member moves vertically when pedaling while improving contact force to the sole of the shoe.

According to an embodiment of the present invention, the plurality of magnet guide members may include: a plurality of guide casings, respectively, each of which consists of a top casing and a bottom casing and is coupled to the operation support housing and the pedal frame; a first magnet guide tube that is provided in the bottom casing, is made of a non-magnetic material and is formed of a hollow member; and a first magnetic body that is accommodated inside the first magnet guide tube and enables vertical movement by repulsive force or attraction to the magnet separation means.

According to an embodiment of the present invention, each guide casing may include: a first guide flange configured as a single part at the center of a front end; and a second guide flange divided into upper and lower portions at a rear end to be spaced apart by a predetermined interval so that the first guide flange enables vertical movement within a range of the spacing, wherein the first guide flange and the second guide flange may be connected to each other by a connection means or, otherwise, may be coupled to the operation support housing and the pedal frame, coupled entirely to the pedal frame or separately coupled.

According to one embodiment of the present invention, the pedal frame may include: a guide frame configured to enable vertical movement of the magnet guide member; a side frame including a plurality of uneven members formed to prevent slippage while coming into contact with the sole during pedaling; a front frame formed at the front of the side frame, to which the operation support housing is coupled; and a rear frame formed at the rear of the side frame, to which the operation support housing is coupled.

According to an embodiment of the present invention, the shoe coupling device may include: a shoe casing made of a metal material, a non-magnetic alloy, carbon fiber, or a non-magnetic material such as aluminum and synthetic resin, which has a seating groove formed therein; a shoe fixing plate coupled to an upper portion of the shoe casing in order to couple the shoe casing to the sole; and a magnet separation means which is provided inside the shoe casing, is formed in a corresponding size and shape within the range of area of the first magnetic body and is coupled to the first magnetic body by magnetic force using an electrical separation method or a physical separation method or, otherwise, may remove metal powder by weakening or reducing the magnetic force.

According to an embodiment of the present invention, the magnet separation means may include: a second magnet guide tube that is seated on the bottom surface of the shoe casing and is made of a metal material, a non-magnetic alloy, carbon fiber, or a non-magnetic material such as aluminum and synthetic resin; a second magnetic body which is inserted inside the second magnet guide tube, is coupled to or decoupled from the first magnetic body by magnetic force, and may separate metal powder according to whether current is applied or not; a coil member that is configured to surround an outer periphery of the second magnet guide tube, and moves the second magnetic body upward while changing polarity of the same when current is applied thereto; and a current supplying means for controlling whether or not the current is applied to the coil member.

According to an embodiment of the present invention, the second magnetic body may be configured to undergo application of current through wireless communication when the current is applied, and may widen a spacing from the bottom surface of the shoe casing and weaken the magnetic force to drop metal powder while moving upward along an inner periphery of the second magnet guide tube, or may weaken attraction with the first magnetic body so as to facilitate separation of the shoe casing and the magnet guide member.

According to an embodiment of the present invention, the magnet separation means may include: a partitioning plate to divide the shoe casing; a plurality of second magnetic bodies built in the partitioning plate, respectively, each of which is coupled to or decoupled from the first magnetic body by magnetic force; and a movement guide tube that guides upward sliding movement of the plurality of second magnetic bodies by mutual repulsive force while guiding the same to form a predetermined spacing from the bottom surface of the shoe casing.

According to an embodiment of the present invention, the magnet separation means may include: a second magnet guide tube made of a metal material, a non-magnetic alloy, carbon fiber, or a non-magnetic material such as aluminum and synthetic resin; a second magnetic body that moves up and down inside the second magnet guide tube and is coupled to or decoupled from the first magnetic body by magnetic force; and a coil spring that is inserted into the second magnet guide tube and consists of a non-magnetic material to float the second magnetic body in a weightless state in an inner space of the second magnet guide tube.

According to an embodiment of the present invention, the magnet separation means may include: a partitioning plate to divide the shoe casing; a second magnetic body that moves up and down inside the second magnet guide tube, and is coupled to or decoupled from the first magnetic body by magnetic force; a fixed hinge that is coupled to an upper end of the partitioning plate and supports rotational operation of the second magnetic body; a rotary hinge that is coupled to an upper surface of the second magnetic body and guides rotational operation of the second magnetic body; and a connecting member that connects the fixed hinge and the rotary hinge and enables upward rotation when the second magnetic body is moved by repulsive force.

According to an embodiment of the present invention, the magnet separation means may include: a partitioning plate to divide the shoe casing; a second magnetic body that moves up and down inside the second magnet guide tube, and is coupled to or decoupled from the first magnetic body by magnetic force; fixed hinges that are configured to be positioned on the same line in the center of the partitioning plate and the central portion of an inner wall surface of the shoe casing, respectively, and support rotational operation of the second magnetic body; a rotary hinge that is configured at each of both sides of the second magnetic body; and a connecting member that connects the fixed hinges and the rotary hinge and moves the second magnetic body upward and downward depending on whether the second magnetic body is coupled to or decoupled from the first magnetic body by magnetic force.

According to an embodiment of the present invention, the magnet separation means may include: a partitioning plate to divide the shoe casing; a second magnetic body that moves up and down inside the second magnet guide tube, and is coupled to or decoupled from the first magnetic body by magnetic force; a fixed hinge that is configured at the center of an inner wall surface of the shoe casing, and supports rotational operation of the second magnetic body; a rotary hinge coupled at one side of the second magnetic body; and a connecting member that connects the fixed hinge and the rotary hinge and moves the second magnetic body upward and downward depending on whether the second magnetic body is coupled to or decoupled from the first magnetic body by magnetic force.

Further, according to another embodiment of the present invention, the shoe coupling device may include: a seating space formed in the sole of a shoe to be opened downward;

a shoe coupling part which is detachably coupled to the seating space, coupled to the sole of the shoe, and accommodates a first magnetic body therein; and a pedal that includes a second magnetic body coupled to a crank arm of a bicycle and magnetically coupled to the first magnetic body, a pedal casing in which a pedal shaft is rotatably coupled, and a plurality of non-magnetic magnet guide tubes which is arranged in the pedal casing and guides the second magnetic body to implement rotational and vertical movement, thereby enabling the first magnetic body and the second magnetic body to maintain attraction to each other.

Effect of Invention

As described above, according to the embodiments of the present invention, each of the shoe coupling device and the pedal may be provided with a magnet, so that coupling is performed by magnetic force when pedaling only, whereas coupling between the magnets is released by a magnet separation means when pedaling is stopped or riding is completed and, at the same time, metal debris or powder stuck to the shoe may drop, thereby preventing the metal debris or powder from being adhered to the shoe.

Further, according to the embodiments of the present invention, the magnet guide member with a built-in magnet may be configured to reciprocate up and down from the pedal, wherein the magnet guide member moves downward by force applied during pedaling in order to improve contact between the shoe and an uneven member of the pedal, thereby attaining effects of preventing the shoe from slipping.

Further, according to the embodiments of the present invention, using mutual repulsive force or attraction between a magnet provided inside the shoe coupling device and a magnet in the pedal, the magnet in the shoe coupling device may move upward from the bottom, whereby magnetic force between metal powder stuck to the bottom surface of a shoe and the magnet is weakened (or reduced) to naturally separate the metal powder, thereby attaining effects of preventing the sole of the shoe from slipping due to the metal powder.

In addition, according to the embodiment of the present invention, the shoe and the pedal are not mechanically coupled but may be combined by magnetic force, so as to quickly separate the shoe from the pedal in an emergency, thereby preventing the risk of personal injury.

BRIEF DESCRIPTION OF DRAWINGS

FIGS. 1 and 2 are perspective views showing a mobile magnet type bicycle pedal according to a first embodiment of the present invention.

FIGS. 3 and 4 are cross-sectional views showing the mobile magnet type bicycle pedal according to the first embodiment of the present invention.

FIG. 5 is a cross-sectional view showing a shoe coupling device combined with the mobile magnet type bicycle pedal according to the first embodiment of the present invention.

FIG. 6 is a plane view schematically showing the shoe coupling device combined with the mobile magnet type bicycle pedal according to the first embodiment of the present invention.

FIG. 7 schematically illustrates a state in which the mobile magnet type bicycle pedal of the first embodiment of the present invention is coupled to the shoe coupling device.

FIGS. 8 to 13 illustrate a magnetic separation means of the shoe coupling device according to the first embodiment of the present invention.

FIG. 14 is a perspective view showing a state in which a mobile magnet type bicycle pedal and a shoe coupling device are combined according to a second embodiment of the present invention.

FIG. 15 is an exploded perspective view showing an exploded configuration of the shoe coupling device combined with the mobile magnet type bicycle pedal according to the second embodiment of the present invention.

FIG. 16 is an exemplary view illustrating a state of pedaling using the shoe coupling device combined with the mobile magnet type bicycle pedal according to the second embodiment of the present invention.

FIG. 17 is a sectional exemplary view illustrating an operation principle of the shoe coupling device combined with the mobile magnet type bicycle pedal according to the second embodiment of the present invention.

BEST MODE

Hereinafter, according to a preferred embodiment of the present invention, the shoe coupling device may be coupled to the sole of a shoe and may be provided with a magnetic separation means to separate metal debris or powder by weakening magnetic force. Specifically, the shoe coupling device may include: a plurality of magnet guide members, in each of which a first magnetic body is mounted in such a way that the first magnetic body is coupled or decoupled by repulsive force or attraction between the magnet separation means and the magnetic body, and which are connected to one another to implement vertical movement thereof; an operation support housing in which both ends of each of the plurality of magnet guide members are coupled to enable vertical movement, and to which a pedal shaft is coupled; and a pedal frame to which the operation support housing is coupled and which enables the magnet guide member to move up and down when pedaling, while improving contact force to the sole of the shoe.

In addition, according to another preferred embodiment of the present invention, the shoe coupling device may further include: a seating space formed in the sole of a shoe to be opened downward; a shoe coupling part which is detachably coupled to the seating space, coupled to the sole of the shoe, and accommodates a first magnetic body therein; and a pedal that includes a second magnetic body coupled to a crank arm of a bicycle and magnetically coupled to the first magnetic body, a pedal casing in which a pedal shaft is rotatably coupled, and a plurality of non-magnetic magnet guide tubes which is arranged in the pedal casing and guides the second magnetic body to implement rotational and vertical movement, thereby enabling the first magnetic body and the second magnetic body to maintain attraction to each other.

DETAILED DESCRIPTION OF PREFERRED EMBODIMENTS OF INVENTION

As shown in FIGS. 1 to 13, the mobile magnet type bicycle pedal according to a first embodiment of the present invention may be detachably connected to the shoe coupling device 400, which is coupled to the sole B of a shoe A, by repulsive force or attraction due to magnetic force. At this time, when pedaling, descending action is performed to bring the sole B into close contact with the pedal, thereby preventing slipping, so that the bicycle pedal may more precisely transmit force of foot movement during pedaling to the pedal to the pedal side, while easily dropping and separating metal debris or powder ("metal powder") generated during pedaling from the shoe A.

The mobile magnet type bicycle pedal may be made of a non-magnetic metal material, a non-magnetic alloy, carbon fiber, or a non-magnetic material such as aluminum, and may include: a plurality of magnet guide members 100, each of which is provided with a first magnet tube 120 to guide vertical movement of a first magnetic body 130 such that coupling or decoupling between the pedal and the shoe coupling device 400 is implemented by repulsive force or attraction; an operation support housing 200 which is connected to a crank arm of the bicycle and to which the magnet guide member 100 is coupled to enable vertical movement; and a pedal frame 300 to which both front and rear ends of the operation support housing 200 are coupled, and which guides vertical movement of the magnet guide member 100 and contacts the sole B of the shoe A, thereby preventing the shoe from slipping.

The magnet guide member 100 may be configured to be divided into upper and lower portions, and may include: a guide casing 110 consisting of a top casing and a bottom casing such that coupling is implemented in a fastening manner by screws, fixing bolts, etc.; a first magnet guide tube 120 that is provided in the bottom casing of the guide casing 110 and is formed of a cylindrical hollow member; a second magnetic body 424 that is accommodated inside the first magnet guide tube 120 and provided in the shoe coupling device 400; and a first magnetic body 130 enabling vertical movement by repulsive force or attraction.

The guide casing 110 may include a predetermined space in which the first magnet guide tube 120 is provided, and may be configured such that an inner side of the top casing comes into contact with an upper surface of the first magnet guide tube 120 when the top and bottom casings are combined, whereby the first magnetic body 130 may not escape to the outside of the first magnet guide tube 120 when being elevated or moving upward by the magnetic force of the second magnetic body 424.

Further, the guide casing 100 may be provided with first and second guide flanges 112 and 114 at the front and rear ends thereof, respectively, wherein the plural guide casings are configured to be connected to one another.

In this regard, the first guide flange 112 may have a single configuration in the central portion at the front end of the guide casing 100, while the second guide flange 114 may be divided into upper and lower portions at a predetermined spacing at the rear end of the guide casing 110.

In other words, when the first guide flange 112 in any one of the plurality of guide casings 110 is inserted into the second guide flange 114 of another guide casing 110, these flanges may be connected to each other by a connection means such as a hinge, a connection shaft, a connection screw or a connection bolt. Further, the first guide flange 112 or the second guide flange 114 may be configured to enable vertical movement within the spacing range between the upper and lower portions of the second guide flange 114.

As such, the plurality of guide casings 100 may include first to fourth guide casings 110*a* to 110*d*. Herein, the second guide flanges 114 of the first and fourth guide casings 110*a* and 110*d* may be configured to enable vertical movement along with a second operation guide member 230 in an operation support housing 200 described below, while the first guide flange 112 of the second and third guide casings 110*b* and 110*c* may be configured to enable vertical movement along with a first operation guide member 220 of the operation support housing 200 described below.

Further, the first guide flange 112 of the first and fourth guide casings 110*a* and 110*b* among the plurality of guide casings 110 may be inserted into the second guide flanges 114 of the second and third guide casings 110*b* and 110*c*, and then, configured to enable vertical movement by any connection means. Further, the second guide flanges 114 of the second and third guide casings 110*b* and 110*c* may be inserted into corresponding positions, respectively, in the guide frame 340 provided in a side frame 310 of a pedal frame 300 described below, and then, configured to enable rotational or vertical movement by the connection means.

The plurality of guide casings 110 of the present invention configured as described above may of course be arranged in different forms based on the shape of the pedal frame 300. Alternatively, each guide casing 110 may be configured to be individually connected to the guide frame 340 without connection of the first guide flange 112 and the second guide flanges 114.

The first magnet guide tube 120 may be made of a non-magnetic material and configured to smoothly move the plurality of first magnetic bodies 130 up and down. Further, one, at least two or more first magnet guide tubes 120 may be provided depending on an area of the guide casing 110, wherein the first magnet guide tubes 120 may be arranged in plural rows and columns with a predetermined interval that can reduce interference of the first magnetic bodies 130 disposed below.

The first magnetic body 130 may number at least one, two or more, and may be configured to move up or down along an inner peripheral surface of the first magnet guide tube 120 when repulsive force or attraction occurs due to magnetic force according to a position of the second magnetic body 424. When coupling is achieved by attraction to the second magnetic body 424, the magnet guide member 100 and the shoe coupling device 400 may be magnetically coupled, thereby preventing the pedal from slipping when a rider pedals. In addition, force of the rider can be accurately transferred to the pedal frame 300 while preventing the force of the rider being lost.

The operation support housing 200 may be coupled to be located at the center of the pedal casing 300, wherein the front end is configured to be connected to the crank arm of the bicycle by the pedal shaft, while a plurality of magnet guide members 100 is coupled to each of both sides to enable vertical movement, thereby serving to support the vertical movement of the magnet guide members 100 as well as pedaling of the rider.

The operation support housing 200 described above may include: a support body 210 having an axial through-hole 212, through which the pedal shaft connected to the crank arm is inserted; the pedal frame 300 coupled at the front end of the support body 210; a first operation guide member 220 to which the guide casing 110 of the magnet guide member 100 is coupled; and a second operation guide member 230 to which the guide casing 110 is coupled at the rear end of the support body 210.

The pedal frame 300 may be a component that connects the pedal to the crank arm of the bicycle; transmits rotational force due to pedaling to the crank arm and, at the same time, prevents the shoe from slipping; and plays a role of supporting vertical movement of the guide casing 110 of the magnet guide member 100.

The pedal frame 300 may include: a side frame 310 that forms both sides and is configured to contact the sole B of the shoe A, and to which the magnet guide member 100 is coupled to enable vertical movement; a front frame 30 to which the first operation guide member 220 of the operation support housing 200 is coupled; and a rear frame 330 formed in the rear portion, to which the second operation guide member 230 of the operation support housing 200 is coupled.

In this case, the side frame 310 may include: a plurality of uneven members 312 at upper and lower faces, respectively, which are in contact with the sole B of the shoe A during pedaling to prevent the shoe from slipping; and a guide frame 340 coupled to the guide casing 110 of the magnet guide member 100 by a connection means.

The guide frame 340 may be provided at each of top and bottom ends in the center of the side frame 310 and may serve to guide the guide casing 110 to move downward along the connection means during pedaling. Further, during lifting operation, the guide casing 110 may be in contact with the inner surface of the guide frame provided at the top end, thereby limiting a range of the lifting operation.

Accordingly, when the rider pedals the bicycle, the guide casing 110 may be pressed and move downward inside the guide frame 340, whereby contact between the uneven members 312 formed on the side frame 310 and the sole B of the shoe A may be improved to thus minimize slippage generated during pedaling.

On the other hand, when the shoe coupling device 400 of the present invention may be a component that more smoothly transmits force of foot movement when pedaling to the pedal side of the bicycle; and weakens magnetic force using mutual repulsive force and attraction between magnets, thereby preventing metal debris or powder generated during riding from being adhered to the shoe A. Further, the shoe coupling device is preferably integrated with the shoe although the sole B of the shoe A may be processed to form a separate seating space in order to accommodate the shoe coupling device in a detachable coupling manner.

Such a shoe coupling device 400 may include: a shoe casing 410 which is made of any one of a non-magnetic metal material, a non-magnetic alloy, carbon fiber, aluminum or a synthetic resin material; and a magnet separation means 420 which is provided inside the shoe casing 410, is formed in a corresponding size and shape within the range of area of the first magnetic body 130, and is coupled to the first magnetic body 130 by magnetic force using an electrical separation method or a physical separation method or, otherwise, may remove metal powder by weakening or reducing the magnetic force.

The shoe casing 410 may include a seating groove 412 formed therein in which the magnet separation means 420 is mounted, may be configured in the form of an enclosure having open top, and may be provided with a shoe fixing plate 402 wherein the shoe casing 410 is closed on the upper surface while fixing the same in the seating space formed on the sole B.

The magnet separation means 420 may be mounted inside the shoe casing 410, and may include a second magnetic body 424 which is coupled to the first magnetic boy 130 in the mobile magnet type pedal through magnetic force according to: an electrical separation method that changes polarity of the magnetic body by applying electric current; or a physical separation method that weakens a magnetic field of the magnetic body using elastic restoration force or rotational force, otherwise, which is decoupled from the first magnetic body 130 by weakening magnetic field in the magnet separation means 420 while moving in either direction by repulsive force and attraction of the magnetic body, and the second magnetic body may be operated to separate metal powder stuck to the sole B.

In the case where the magnet separation means 420 adopts the electrical separation method for coupling or decoupling between the first magnetic body 130 and the second magnetic body 424, as shown in FIGS. 5 and 6, the magnet separation means may include: a second magnet guide tube 422 which is seated on the bottom surface of the shoe casing 410 and is made of a metal material, a non-magnetic alloy, carbon fiber or a non-magnetic material such as aluminum and synthetic resin; the second magnetic body 424 which is inserted in the second magnet guide tube 422 and is coupled to or decoupled from the first magnetic body 130 by magnetic force, and may separate metal powder from the sole C depending on whether current is applied or not; a coil member 426 that is configured to surround an outer periphery of the second magnet guide tube 422, and moves the second magnetic body 424 upward while changing polarity of the same when current is applied thereto; and a current supplying means 430 for controlling whether or not the current is applied to the coil member 426.

At this time, the second magnet guide tube 422 may be configured in the same shape as the first magnet guide tube 120, and the second magnetic body 424 also preferably has the same shape as the first magnetic body 130.

Further, when the shoe A is seated on the pedal frame 300, the second magnetic body 424 may be seated on the bottom surface of the shoe casing 410 and generate attraction due to magnetic force, which in turn is coupled to the first magnetic body 130 built in the guide casing 110 of the magnet guide member 100, resulting in coupling between the shoe A and the mobile magnet type pedal.

In the case where the second magnetic body 424 is provided in the magnet separation means 420 configured in an electrical separation manner, when the current is applied to the coil member 426 through the current supplying means 430, the polarity of an electrode may be changed to allow separation of the second magnetic body 424 from the first magnetic body 130 by repulsive force and, at the same time, the second magnetic body 424 may move upward along an inner periphery of the second magnet guide tube 422 to widen a spacing from the bottom surface of the shoe casing 410, thereby weakening the magnetic force and dropping metal powder stuck to the sole B due to the magnetic force of the second magnetic body 424.

At this time, the current supplying means 430 may be a built-in battery to apply current, and may further include a control means to control whether the battery is supplied with current.

In this regard, the control means may be a current supply switch, but is not limited thereto. Further, the control means may include, for example, a board on which a current supply signal is transmitted and received through a wireless network, a wireless communication module such as Bluetooth, etc.

Further, the control means may also be provided in the first magnet guide tube 120 and, accordingly, the first magnetic body 130 mounted in the first magnet guide tube 120 may also be configured to easily separate the shoe from the pedal by a current application method.

In other words, when applying current to each of the first and second magnetic bodies 130 and 424 to have the same polarity by the control means, separation may be performed by repulsive force, thereby easily separating the shoe from the pedal.

On the other hand, in the case where the magnet separation means 420 of the present invention adopts a physical separation method, as shown in FIG. 8, the second magnetic body 424 may be configured to move upward in a sliding manner within the shoe casing 410.

That is, the shoe casing 410 may be provided with: a partitioning plate 440 to divide a seating groove 412, wherein a plurality of second magnetic bodies 424 is built in corresponding spaces divided by the partitioning plate 440, respectively, and may move by mutual repulsive force to ensure a spacing between the second magnetic bodies 424; and a movement guide tube 510 for guiding the second magnetic bodies to move upward in a sliding manner when the second magnetic bodies 45 move due to the repulsive force.

At this time, the movement guide tube 510 may be configured to form a predetermined curvature so as to more easily move the second magnetic body 424.

However, the present invention is not limited to the above configurations and, as shown in FIG. 9, the present invention may be provided with: a second magnet guide tube 422 that is made of a metal material, a non-magnetic alloy, carbon fiber, or a non-magnetic material such as aluminum and synthetic resin, and includes a second magnetic body 424 mounted to enable vertical movement; and a coil spring 520 that is inserted into the second magnet guide tube 422, is configured to contact an outer periphery of the second magnetic body 424, and floats the second magnetic body 424 in a weightless state in an inner space of the second magnetic guide tube 422.

In this case, the coil spring 520 may be made of a non-magnetic material, and may be positioned to be spaced apart from the bottom surface of the shoe casing 410 at a predetermined distance by a predetermined elastic force, wherein the second magnetic body 424 moves up and down within the elastic force range of the coil spring 520 to implement coupling and decoupling between the second magnetic body 424 and the first magnetic body 130 through magnetic force and, when the second magnetic body is separated from the first magnetic body 130, metal powder stuck to the sole B is removed while the second magnetic body 424 moves upward simultaneously.

Meanwhile, the magnet separation means 420 of the present invention may include a plurality of second magnetic bodies 424 inside the shoe casing 410 divided by the partitioning plate 440, wherein, when the second magnetic bodies 424 move to widen a spacing therebetween by mutual repulsive force, lifting movement of each second magnetic body 424 is performed by rotational operation to widen the distance.

At this time, the magnet separation means 420 may be coupled to a top end of the partitioning plate 440, and may include: a fixed hinge 532 to support rotational operation of the second magnetic body 424; a rotary hinge 534 that is coupled on an upper surface of the second magnetic body 424 and guides the rotational operation of the second magnetic body 424; and a connection member 536 to connect the fixed hinge 532 and the rotary hinge 536.

Herein, the connection member 536 may be formed of a leaf spring and, when the second magnetic body 424 is moved by the repulsive force, may rotate upwardly around the fixed hinge 532.

Further, as shown in FIG. 11, in the magnet separation means 420, when the fixed hinges 532 are configured to be positioned on the same line in the center of the partitioning plate 440 and the central portion of an inner wall surface of the shoe casing 410, respectively, and when the rotary hinge 534 is configured at each of both sides of the second magnetic body 424 and coupled to the first magnetic body 130, the second magnetic body 424 may move downward.

On the other hand, when the rotary hinge is separated from the first magnetic body 130, lifting movement may be performed by elasticity of the connection member 536 consisting of a leaf spring.

Further, as shown in FIG. 12, the magnet separation means 420 may also be provided with: a fixed hinge 532 formed only in the center of the inner wall surface of the shoe casing 410; and a rotary hinge 534 that is formed only on one side of the second magnetic body 424 and may be configured to be connected by the connection member 536, wherein lifting movement may be performed by elasticity of the connection member 536 consisting of a leaf spring.

On the other hand, as shown in FIG. 13, the connection member 536 to form the magnet separation means 420 of the present invention is not particularly limited to the leaf spring but may include any of elastic wire, common coil springs, etc. Further, in a state in which the first magnetic body 130 is not coupled to the connection member, the connection member may be maintained in a floating state in the shoe casing 410. On the other hand, when coupled, the connection member may be coupled to the first magnetic body 130 by magnetic force while a predetermined elastic restoration force is generated. Therefore, when the connection member is separated from the first magnetic body 130, even if there is no separating operation, the connection member may be spaced a predetermined distance from the bottom surface of the shoe casing 410 by the elastic restoration force, thereby easily removing metal powder stuck to the sole B.

Further, according to a second embodiment of the present invention, as shown in FIGS. 14 to 17, the shoe coupling device 400 may more smoothly transmit force of foot movement when a rider pedals a bicycle to the pedal 1120, while easily separating the shoe from the pedal 1120 in an emergency situation.

To this end, the mobile magnet type bicycle pedal and the shoe coupling device 400 may include: a shoe coupling part 401 coupled to a sole B of a shoe worn by the rider; and a pedal 1120 coupled to or decoupled from the shoe coupling part 401 by magnetic force.

The shoe coupling part 401 may be coupled to a seating space C formed on the sole B of the shoe A. The shoe coupling part 401 may be manufactured in an integrated form with the shoe A or may be detachably combined with the shoe A. Therefore, there is an advantage of being compatible with different shoes of any riders. That is, the rider may cut out the sole B of the shoe A to match the seating space C and then fit the shoe coupling part 401 into the space for use.

The shoe coupling part 401 may include: a shoe casing 410 fitted in the seating space C; a shoe fixing plate 402 extending over the shoe casing 410 in order to dispose the shoe casing 410 on the sole B; and a first magnetic body 130 accommodated inside the shoe casing 410.

The shoe casing 410 may be made of a non-magnetic metal material, a non-magnetic alloy or a non-metallic material such as carbon fiber. Preferably, the shoe casing is formed of an aluminum material that is lightweight, inexpensive and has good durability. The shoe casing 410 may have a size and shape corresponding to the area of a magnet provided in a pedal casing 1121.

The shoe fixing plate 402 may be provided in the form of a plate having a larger area than the seating space C on an upper portion of the shoe casing 410. As shown in FIG. 5, the shoe fixing plate 402 may be mounted on top of the sole B through the inside of the shoe A, thereby preventing the shoe casing 410 from being separated from the shoe A through the seating space C.

The first magnetic body 130 may be accommodated inside the shoe casing 410. Herein, a filling cushion 115 may be optionally provided so that the first magnetic body 130 may not move but be disposed and secured in the same position of the magnet guide tube, at which the first magnetic body can be optimally coupled to the second magnetic body.

Further, optionally, a magnet fixing plate 116 to secure a position of the first magnetic body 130 may further be provided, wherein positioning screws may be provided in the magnet fixing plate to adjust the position, so as to correct pedaling posture of the rider.

Meanwhile, with regard to the shoe coupling part 401 according to a preferred embodiment of the present invention, the shoe casing 410 may be provided in the form of a single enclosure wherein a first magnetic body 130 is fixed therein. However, in some cases, the shoe casing 410 may be detachably provided in the form of a top casing and a bottom casing, and the first magnetic body 130 may be accommodated therebetween. In this case, there is an advantage of separating the top casing and the bottom casing in order to replace the first magnetic body with another one having different magnetic force.

Optionally, the shoe casing 410 may be detachably coupled to the shoe fixing plate 402 in a drawer form. That is, the shoe fixing plate 402 may be formed in the shape of an enclosure having a seating space therein, while the shoe casing 410 may be detachably coupled inside the enclosure.

Further, the shoe fixing plate 402 may be provided with an adjustment lever to align the position with the second magnetic body 424, wherein the position of the shoe fixing plate 402 is adjusted to be aligned with the second magnetic body 424 by operation of the adjustment lever.

The pedal 1120 may be coupled to a bicycle in order to transmit the pedaling force of the rider to the chain so that the wheel is rotated. The pedal 1120 of the present invention may be detachably coupled to the shoe coupling part by magnetic force, thereby supporting the pedaling of the rider.

As shown in FIG. 3, the pedal 1120 may include: a pedal casing 1121; a pedal shaft 1123 extending from one side of the pedal casing 1121; a plurality of magnet guide tubes 1125 accommodated inside the pedal casing 1121; and a second magnetic body 424 accommodated inside the magnetic guide tubes 1125 to rotate and move up and down.

The pedal casing 1121 may be made of a non-magnetic metal material. The pedal casing 1121 is typically in the form of rectangular box or enclosure, but the shape may vary according to the position of the magnet guide tube inside the pedal casing.

The pedal shaft 1123 may be coupled to a crank arm (33 in FIG. 1) connected to a crank (31 in FIG. 1) of the bicycle 30. A thread for coupling with the crank arm 33 may be formed on the surface of the pedal shaft 1123. The pedal shaft 1123 may be rotatably coupled to the pedal casing 1121. Accordingly, the pedal shaft can be rotated in conjunction with rotation of the crank arm 33.

The pedal 1120 according to the preferred embodiment of the present invention may be provided at a fixed position by fitting the magnet guide tube 1125 inside the pedal casing 1121 but, in some cases, the magnet guide tube 1125 may be integrally fixed and coupled inside the pedal casing 1121. That is, a support shaft (not shown) may extend inside the pedal casing 1121 coaxially with the pedal shaft 1123, while a connection shaft connected to magnet guide tubes 1125 at both sides of the support shat (not shown) may extend to be coupled to the magnet guide tubes 1125.

Each magnet guide tube 1125 may be accommodated inside the pedal casing 1121 to support the second magnetic body 424 to rotate and move up and down therein. The magnet guide tube 1125 may be provided in the form of a cylindrical hollow tube having an empty inner space or a polygonal tube as shown in FIG. 3.

A height of the magnet guide tube 1125 may correspond to a height of the pedal casing 1121, and may be inserted into the pedal casing 1121 in order to secure the position. The magnet guide tube 1125 is preferably made of a non-magnetic material for smooth movement of the second magnetic material 424.

The magnet guide tube 1125 may be provided in plural according to an area of the pedal casing 1121. The magnet guide tube 1125 may be provided in a plurality of rows and columns inside the pedal casing 1121 at a predetermined interval that can reduce interference of each magnet disposed on the bottom, while the second magnetic bodies 424 provided in the magnet guide tube 1125 may generate traction by magnetic force throughout the area between the second magnetic bodies and the first magnetic body 130.

Each second magnetic body 424 may be accommodated in the magnet guide tube 1125 and may be coupled to implement rotation or vertical movement by magnetic force applied from the first magnetic body 130, thereby supporting the pedaling of the rider such as prevention of slippage. The second magnetic body 424 may also be formed in a circular or rectangular shape, beads or quadrangular column shape, as illustrated in FIG. 3.

As shown in FIG. 5, the second magnetic body 424 may be formed to have N-pole and S-pole. The second magnetic body 424 may move in a direction of generating attraction with the first magnetic body 130 according to a position where the rider puts the shoes A on the pedal casing 1121.

For example, when a lower portion of the first magnetic body 130 is an S-pole, the second magnetic body 424 may rotate in the magnet guide tube 1125 to allow the N-pole facing the first magnetic body 130 and then move upward.

Herein, a diagonal length W2 of the entire second magnetic body 424 may be formed smaller than a width W1 of the magnet guide tube 1125. Accordingly, when the second magnetic body 424 moves up and down or rotates in the magnet guide tube 1125, more smooth movement may be obtained without interference.

In this case, the second magnetic body 424 according to the preferred embodiment of the present invention is formed in a circular column shape, however, may be provided in various rotatable shapes such as a sphere or oval.

A process of using the mobile magnet type bicycle pedal and the shoe coupling device 400 having the above configurations according to the present invention will be described with reference to FIGS. 2 to 5.

A rider may separate an insole (not shown) of the shoe A own by the rider and cut the seating space C in the sole B of the shoe A. Then, the shoe coupling part 401 may be inserted into the shoe A. The shoe casing 410 of the shoe coupling part 401 may be inserted into the seating space C, and the shoe fixing plate 402 may be located on an upper portion of the sole B so that the shoe coupling part 401 is not separated from the shoe A.

The insole (not shown) may be put again on the shoe A in which the shoe coupling part 401 was inserted, thereby completing the coupling.

Meanwhile, the rider may separate the existing pedal coupled to the crank arm of the bicycle, instead, combine the pedal 1120 of the present invention with the same crank arm. The pedal shaft 1123 extending to the pedal casing 1121 may be screw-coupled to the crank arm.

When the combination of the pedal 1120 and the bicycle is completed, the rider may ride the bicycle 430 while wearing the shoe A combined with the shoe coupling part 401. As shown in FIG. 4, when the shoe A of the rider presses the pedal 1120, the shoe coupling part 401 and the pedal 1120 may be coupled to each other by magnetic force.

That is, as shown in FIG. 5, the second magnetic body 424 may rotate and move upward in a direction in which attraction is generated in the magnet guide tube 1125 according to the magnetic polarity of the first magnetic body 130 of the shoe A.

Since the shoe A and the pedal 1120 may be closely coupled to each other by attraction of the magnet, the rider can step on the pedal 1120 without slippage. Further, in addition to the force of foot movement to step on the pedal 1120, when lifting the pedal 1120, the pedal 1120 may also be lifted under traction by magnetic force in conjunction with lifting of the shoe A, whereby the rider can apply relatively stronger force to the pedal so as to increase a speed of the bicycle or increase advanced force on an uphill road.

Further, the pedal 1120 and the shoe A may be coupled to each other by attraction between the first magnetic body 130 and the second magnetic body 424. Accordingly, since a stepping position on the pedal 1120 is always kept, a riding posture of the rider may be corrected.

On the other hand, if an emergency situation such as falling of the bicycle occurs during riding, the rider may move the shoe back and forth in a horizontal direction with respect to the pedal 1120, thereby quickly and easily separating the shoe from the pedal 1120.

In other words, since magnetic force greatly influences in a vertical direction, slippage may be prevented by the coupling through traction force of the magnet during pedaling and, even when lifting the pedal 1120 upward, a larger force may be transmitted by the traction force. On the other hand, in the case of emergency, it is possible to quickly release the coupling to the pedal 1120 by moving the shoe in a horizontal direction with respect to the pedal 1120.

Accordingly, it is possible to prevent human accidents often occurred because shoes could not quickly decoupled from the pedals when riding a bicycle with the shoes in which cleats are installed in the related art.

Meanwhile, the mobile magnet type bicycle pedal and the shoe coupling device described above may be provided with the magnet guide tube, in which the second magnetic body is accommodated, inside the pedal casing. That is, the magnet guide tube and the second magnetic body are positioned and secured inside the pedal casing.

However, the above configuration is only an example and, in some cases, the pedal casing may be detachably coupled in a drawer form in order to facilitate attachment/detachment of the second magnetic body in the pedal casing.

However, the pedal casing may be screw-coupled to the pedal on a pedal shaft using fixing screws in order to secure the position thereof.

As such, when a magnet casing is detachably coupled to the pedal casing, the second magnetic body may be used with differently changeable magnetic force.

That is, the magnetic force of the second magnetic body can be adjusted according to riders using the bicycle. Specifically, in the case of children or old persons, the second magnetic body may be designed to have relatively small magnetic force. Further, in the case of young adults or athletes, the second magnetic body may be designed to have stronger magnetic force.

DESCRIPTION OF REFERENCE NUMERALS

100: Magnet guide member 110: Guide casing
120: First magnet guide tube 130: First magnetic body
200: Operation support housing 210: Support body
220: First operation guide member 230: Second operation guide member
300: Pedal frame 310: Side frame
320: Front frame 330: Rear frame
340: Guide frame 400: Shoe coupling device
402: Shoe fixing plate 410: Shoe casing
420; Magnetic separation means 422: Second magnet guide tube
424: Second magnetic body 426: Coil member
430: Current supply means 440: Partitioning plate
510: Movement guide tube 520: Coil spring
532: Fixed hinge 534: Rotary hinge
536: Connection member 1115: Filling cushion
1120: Pedal 1121: Pedal casing
1123: Pedal shaft 1125: Magnet guide tube

The invention claimed is:

1. A shoe coupling device provided with a mobile magnet bicycle pedal and a metal powder attachment preventing means, comprising:
   a shoe coupling device which is coupled to the sole of a shoe and includes a magnetic separation means configured to weaken or reduce magnetic force and separate metal debris or powder;
   a plurality of magnet guide members, each of which includes a first magnetic body built therein in such a way that coupling or decoupling is implemented by repulsive force or attraction between the magnetic separation means and the magnetic body, and which is connected to one another to move upward and downward;
   an operation support housing to which opposite ends of the plurality of magnet guide members are coupled to enable vertical movement, and to which a pedal shaft is further coupled; and
   a pedal frame to which the operation support housing is coupled, wherein each magnet guide member has vertical movement when pedaling while improving contact force to the sole of the shoe.

2. The shoe coupling device according to claim 1, wherein the plurality of magnet guide members includes:
   a plurality of guide casings, respectively, each of which consists of a top casing and a bottom casing and is coupled to the operation support housing and the pedal frame;
   a first magnet guide tube that is provided in the bottom casing, is made of a non-magnetic material and is formed of a hollow member; and
   a first magnetic body that is accommodated inside the first magnet guide tube and enables vertical movement by repulsive force or attraction to the magnet separation means.

3. The shoe coupling device according to claim 2, wherein each of the plurality of guide casings includes:
   a first guide flange configured as a single part at the center of a front end; and
   a second guide flange divided into upper and lower portions at a rear end to be spaced apart by a predetermined interval so that the first guide flange enables vertical movement within a range of the spaced interval,
   wherein the first guide flange and the second guide flange are connected to each other by a connection means or, otherwise, are coupled to the operation support housing and the pedal frame, or are coupled entirely to the pedal frame or separately coupled.

4. The shoe coupling device according to claim 1, wherein the pedal frame includes:
   a guide frame configured to enable vertical movement of the magnet guide member;
   a side frame including a plurality of uneven members formed to prevent slippage while coming into contact with the sole during pedaling;
   a front frame formed at the front of the side frame, to which the operation support housing is coupled; and
   a rear frame formed at the rear of the side frame, to which the operation support housing is coupled.

5. The shoe coupling device according to claim 1, wherein the shoe coupling device includes:
   a shoe casing which is made of any one of a metal material, non-magnetic alloy, carbon fiber, or non-magnetic material such as aluminum and synthetic resin, and includes a seating groove formed therein;
   a shoe fixing plate which is coupled on an upper portion of the shoe casing and allows the shoe casing to be coupled to the sole; and
   a magnet separation means which is provided inside the shoe casing, is formed in a corresponding size and shape within an area range of the first magnetic body, and is coupled to the first magnetic body by magnetic force using an electrical separation method or a physical separation method or, otherwise, removes metal debris or powder by weakening or reducing the magnetic force.

6. The shoe coupling device according to claim 5, wherein the magnet separation means includes:
   a second magnet guide tube which is seated on the bottom surface of the shoe casing and is made of a metal material, non-magnetic alloy, carbon fiber or non-magnetic material such as aluminum and synthetic resin;
   a second magnetic body which is inserted in the second magnet guide tube and is coupled to or decoupled from the first magnetic body by magnetic force, and separates metal debris or powder depending on whether current is applied or not;
   a coil member that is configured to surround an outer periphery of the second magnet guide tube, and moves the second magnetic body upward while changing polarity of the same when current is applied thereto; and
   a current supply means for controlling whether or not the current is applied to the coil member.

7. The shoe coupling device according to claim 6, wherein the second magnetic body is configured to undergo application of current through wireless communication when the current is applied, and widens a spacing from the bottom surface of the shoe casing and weakens the magnetic force to drop metal powder while moving upward along an inner periphery of the second magnet guide tube or, otherwise, weakens attraction with the first magnetic body so as to facilitate separation of the shoe casing and the magnet guide member from each other.

8. The shoe coupling device according to claim 5, wherein the magnet separation means includes:
   a partitioning plate to divide the shoe casing;
   a plurality of second magnetic bodies built in the partitioning plate, respectively, each of which is coupled to or decoupled from the first magnetic body by magnetic force; and
   a movement guide tube that guides upward sliding movement of the plurality of second magnetic bodies by mutual repulsive force while guiding the same to form a predetermined spacing from the bottom surface of the shoe casing.

9. The shoe coupling device according to claim 5, wherein the magnet separation means includes:
   a second magnet guide tube made of a metal material, non-magnetic alloy, carbon fiber, or non-magnetic material such as aluminum and synthetic resin;
   a second magnetic body that moves up and down inside the second magnet guide tube and is coupled to or decoupled from the first magnetic body by magnetic force; and
   a coil spring that is inserted into the second magnet guide tube and consists of a non-magnetic body to float the second magnetic body in a weightless state on an inner space of the second magnet guide tube.

10. The shoe coupling device according to claim 5, wherein the magnet separation means includes:
    a partitioning plate to divide the shoe casing;
    a second magnetic body that moves up and down inside the second magnet guide tube, and is coupled to or decoupled from the first magnetic body by magnetic force;
    a fixed hinge that is coupled to an upper end of the partitioning plate and supports rotational operation of the second magnetic body;
    a rotary hinge that is coupled to an upper surface of the second magnetic body and guides rotational operation of the second magnetic body; and
    a connecting member that connects the fixed hinge and the rotary hinge and enables upward rotation when the second magnetic body is moved by repulsive force.

11. The shoe coupling device according to claim 10, wherein the connection member is configured of any one among a leaf spring, an elastic wire and a coil spring.

12. The shoe coupling device according to claim 5, wherein the magnet separation means includes:
    a partitioning plate to divide the shoe casing;
    a second magnetic body that moves up and down inside the second magnet guide tube, and is coupled to or decoupled from the first magnetic body by magnetic force;
    fixed hinges that are configured to be positioned on the same line in the center of the partitioning plate and the central portion of an inner wall surface of the shoe casing, respectively, and support rotational operation of the second magnetic body;
    a rotary hinge that is configured at each of both sides of the second magnetic body; and
    a connecting member that connects the fixed hinges and the rotary hinge and moves the second magnetic body upward and downward depending on whether the second magnetic body is coupled to or decoupled from the first magnetic body by magnetic force.

13. The shoe coupling device according to claim 12, wherein the connection member is configured of any one among a leaf spring, an elastic wire and a coil spring.

14. The shoe coupling device according to claim 5, wherein the magnet separation means includes:
    a partitioning plate to divide the shoe casing;
    a second magnetic body that moves up and down inside the second magnet guide tube, and is coupled to or decoupled from the first magnetic body by magnetic force;
    a fixed hinge that is configured at the center of an inner wall surface of the shoe casing, and supports rotational operation of the second magnetic body;

a rotary hinge coupled at one side of the second magnetic body; and a connecting member that connects the fixed hinge and the rotary hinge and moves the second magnetic body upward and downward depending on whether the second magnetic body is coupled to or decoupled from the first magnetic body by magnetic force.

15. The shoe coupling device according to claim 14, wherein the connection member is configured of any one among a leaf spring, an elastic wire and a coil spring.

16. A shoe coupling device provided with a mobile magnet bicycle pedal and a metal powder attachment preventing means, comprising:

a seating space formed in the sole of a shoe to be opened downward;

a shoe coupling part which is detachably coupled to the seating space, coupled to the sole of the shoe, and accommodates a first magnetic body therein; and a pedal that includes a second magnetic body coupled to a crank arm of a bicycle and magnetically coupled to the first magnetic body, a pedal casing in which a pedal shaft is rotatably coupled, and a plurality of non-magnetic magnet guide tubes which is arranged in the pedal casing and guides the second magnetic body to implement rotational and vertical movement, thereby enabling the first magnetic body and the second magnetic body to maintain attraction to each other.

17. The shoe coupling device according to claim 16, wherein the pedal includes:

a pedal casing including a pedal shaft formed to be coupled to the crank arm;

a magnet casing that accommodates the second magnetic body, and is detachably coupled to the pedal casing in a drawer form; and a fixing screw to secure the magnet casing on the pedal casing.

18. The shoe coupling device according to claim 17, wherein the shoe casing is detachably coupled to the shoe fixing plate in a drawer form.

19. The shoe coupling device according to claim 16, wherein the shoe coupling part includes:

a shoe casing to accommodate the first magnetic body therein on a position corresponding to the second magnetic body;

a shoe fixing plate that is formed on an upper portion of the shoe casing with a larger area than an area of the seating space, thereby positioning the shoe casing on the sole; and an adjustment lever provided in the shoe fixing plate in order to secure the first magnetic body and align the position thereof with the second magnetic body.

\* \* \* \* \*